(12) United States Patent
Hartog et al.

(10) Patent No.: US 9,377,551 B2
(45) Date of Patent: Jun. 28, 2016

(54) METHOD OF BOREHOLE SEISMIC SURVEYING USING AN OPTICAL FIBER

(71) Applicant: Schlumberger Technology Corporation, Sugar Land, TX (US)

(72) Inventors: Arthur H. Hartog, Winchester (GB); Bernard Frignet, Paris (FR); Duncan Mackie, Aberdeenshire (GB); Michael Clark, West Lothian (GB)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 362 days.

(21) Appl. No.: 13/900,372

(22) Filed: May 22, 2013

(65) Prior Publication Data

US 2014/0347957 A1    Nov. 27, 2014

(51) Int. Cl.
| | |
|---|---|
| *G01V 1/40* | (2006.01) |
| *G01V 1/42* | (2006.01) |
| *G01V 1/44* | (2006.01) |
| *G01H 9/00* | (2006.01) |
| *G01V 1/20* | (2006.01) |

(52) U.S. Cl.
CPC .................. *G01V 1/40* (2013.01); *G01H 9/004* (2013.01); *G01V 1/20* (2013.01); *G01V 1/42* (2013.01); *G01V 1/44* (2013.01); *G01V 2210/1429* (2013.01)

(58) Field of Classification Search
CPC ............ G01V 1/42; G01V 1/44; G01V 1/20; G01V 1/40; G01H 9/004
USPC ................................................ 367/25, 33, 35
See application file for complete search history.

(56) References Cited

U.S. PATENT DOCUMENTS

| 4,105,070 | A | * | 8/1978 | Lavigne et al. ........... 166/250.13 |
| 4,448,250 | A | * | 5/1984 | Cooke et al. ................ 166/255.1 |
| 4,716,260 | A | * | 12/1987 | Hoffman et al. .......... 174/102 R |
| 5,194,847 | A | * | 3/1993 | Taylor et al. ................... 340/557 |
| 5,917,160 | A | * | 6/1999 | Bailey ............................ 181/112 |
| 7,324,730 | B2 | * | 1/2008 | Varkey et al. ................. 385/102 |

(Continued)

FOREIGN PATENT DOCUMENTS

| GB | 2140554 A | 11/1984 |
| GB | 2222247 A | 2/1990 |

(Continued)

OTHER PUBLICATIONS

Barberan, et al., "Multi-offset Seismic Acquisition Using Optical Fiber Behind Tubing", 74th EAGE Conference & Exhibition, Copenhagen, Jun. 4-7, 2012, 6 pages.

(Continued)

*Primary Examiner* — Luke Ratcliffe
*Assistant Examiner* — Amienatta M Ndure Jobe
(74) *Attorney, Agent, or Firm* — Michael Dae

(57) ABSTRACT

A method of detecting seismic waves traveling through a subsurface formation includes lowering a cable into a borehole in the subsurface formation, the cable having at least one optical fiber associated therewith, and causing descent of a remote end of the cable to be arrested. The method further includes feeding a further length of the cable into the borehole such that the cable is slack and in contact with at least part of a wall of the borehole, and using an interrogator coupled to the at least one optical fiber to detect seismic waves traveling through the subsurface formation and into the cable.

29 Claims, 8 Drawing Sheets

(56) References Cited

U.S. PATENT DOCUMENTS

| | | | |
|---|---|---|---|
| 7,593,115 | B2 | 9/2009 | Hernandez-Solis et al. |
| 7,668,411 | B2 | 2/2010 | Davies et al. |
| 7,859,654 | B2 | 12/2010 | Hartog |
| 7,860,362 | B2* | 12/2010 | Varkey et al. ................. 385/105 |
| 7,912,333 | B2* | 3/2011 | Varkey et al. ................. 385/101 |
| 7,920,765 | B2* | 4/2011 | Varkey ......................... 385/104 |
| 7,995,197 | B2* | 8/2011 | Sikora et al. ................. 356/73.1 |
| 8,408,064 | B2* | 4/2013 | Hartog et al. .................... 73/643 |
| 2005/0283276 | A1* | 12/2005 | Prescott et al. ............... 700/282 |
| 2006/0280412 | A1* | 12/2006 | Varkey ......................... 385/101 |
| 2008/0204703 | A1* | 8/2008 | Hernandezs-Solis et al. .... 356/6 |
| 2008/0264631 | A1* | 10/2008 | Mendez et al. .......... 166/250.01 |
| 2009/0304322 | A1* | 12/2009 | Davies et al. ................... 385/12 |
| 2010/0014071 | A1* | 1/2010 | Hartog ........................ 356/73.1 |
| 2010/0074583 | A1* | 3/2010 | Varkey et al. ................. 385/101 |
| 2010/0116510 | A1* | 5/2010 | Varkey et al. ................. 166/385 |
| 2010/0195436 | A1* | 8/2010 | Kamata et al. .................... 367/25 |
| 2011/0069302 | A1* | 3/2011 | Hill ........................ G01V 1/186 356/73.1 |
| 2011/0292763 | A1* | 12/2011 | Coates et al. .................... 367/25 |
| 2012/0067118 | A1* | 3/2012 | Hartog et al. .............. 73/152.16 |

FOREIGN PATENT DOCUMENTS

| | | |
|---|---|---|
| GB | 2442745 A | 4/2008 |
| WO | 2010136810 A2 | 12/2010 |
| WO | 2013059315 A1 | 4/2013 |

OTHER PUBLICATIONS

Barnoski, M.K. et al., "Fiber waveguides: a novel technique for investigating attenuation characteristics", Applied Optics, 15(9), 1976, pp. 2112-2115.

Gold, et al., "Analysis of backscatter waveforms from single-mode fibres", 8th European Conference on Optical Communication, C-26, 1982, pp. 633-639.

Healey, P. "Statistics of Rayleigh Backscatter from a Single-Mode Fiber", IEEE Transaction on Communications, 35(2), 1987, pp. 210-214.

Juarez, J.C. et al., "Distributed Fiber-Optic Intrusion Sensor System", Journal of Lightwave Technology, 23(6), 2005, pp. 2081-2087.

Madsen, et al., "A VSP Field Trial Using Distributed Acoustic Sensing in a Producing Well in the North Sea", 74th EAGE Conference & Exhibition, Jun. 4-7, 2012, 5 pages.

Mestayer, et al., "Distributed Acoustic Sensing for Geophysical Monitoring", 74th EAGE Conference & Exhibition, Jun. 4-7, 2012, 4 pages.

Mestayer, J. , "Field Trials of Distributed Acoustic Sensing for Geophysical Monitoring", SEG 2011 annual meeting, San Antonio, TX, 2011, pp. 4253-4257.

Miller, et al., "Vertical Seismic Profiling Using a Fibre-optic Cable as a Distributed Acoustic Sensor", 74th EAGE Conference & Exhibition, Jun. 4-7, 2012, 5 pages.

Posey, R.J. et al., "Strain Sensing Based on Coherent Rayleigh Scattering in the Optical Fibre", Electronics Letter, 36(20), 2000, pp. 1688-1689.

Shatalin, et al., "Interferometric optical time-domain reflectometry for distributed optical-fiber sensing", Applied Optics, vol. 37(24), 1998, pp. 5600-5604.

Hartog, et al. "The Optics of Distributed Vibration Sensing," Second EAGE Workshop on Permanent Reservoir Monitoring—Current and Future Trends, Stavanger, Norway, Jul. 2-5, 2013, 5 pages.

Hartog "Raman sensors and their applications," OFS2012 22nd International Conference on Optical Fiber Sensors, Oct. 4, 2012, Proc. of SPIE vol. 8421, 84210K, 6 pages.

International Search Report and the Written Opinion for International Application No. PCT/US2014/039186 dated Oct. 23, 2014.

* cited by examiner

METHOD OF BOREHOLE SEISMIC SURVEYING USING AN OPTICAL FIBER

BACKGROUND

In the field of hydrocarbon extraction from subsurface formations, seismic surveying from both the surface as well from within a borehole in a subsurface formation is used to provide a variety of structural and stratigraphic information about the formation. Borehole seismic surveying is often used to link time-based surface seismic images with depth-based well logs, although modern advancements in borehole seismic surveying allow a much greater variety of information to be produced. For example, borehole seismic surveying can provide information about reservoir depth, extent and heterogeneity, as well as fluid content, rock-mechanical properties, pore pressure, oil-recovery progress, elastic anisotropy, induced-fracture geometry, and natural-fracture orientation and density.

An example borehole seismic tool includes multiple portions, with each portion having a set of seismic receivers and a clamping device. To deploy such a tool, the tool is lowered into the borehole on a wireline. At certain locations in the borehole, the wireline is stopped, and one or more portion(s) of the tool is clamped to the bare wall of the borehole or to casing lining the borehole. The wireline is then further unspooled until another such location is reached, at which point the wireline is again stopped, and another portion of the tool is clamped. This process continues until all portions of the tool are clamped, at which point a series of shots from a seismic source are fired. The seismic receivers detect the resulting seismic waves propagating through the formation, and send data about those seismic waves uphole for recording and processing by a logging unit.

Due to the multiple starts and stops of the wireline used to deploy such a borehole seismic tool, total deployment time can be lengthy. Since rig time is expensive, particularly in deep water applications, development of a borehole seismic tool with a quicker deployment time is therefore desirable.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In accordance with this disclosure, a method of detecting seismic waves traveling through a subsurface formation may include lowering a cable into a borehole in the subsurface formation, the cable having at least one optical fiber associated therewith. The method may further include causing descent of a remote end of the cable to be arrested, and feeding a further length of the cable into the borehole such that the cable is slack and in contact with at least part of a wall of the borehole. The method may also include using an interrogator coupled to the at least one optical fiber to detect seismic waves traveling through the subsurface formation and into the cable.

Another aspect is directed to a method of detecting seismic waves traveling through a subsurface formation. The method may include lowering a cable into a borehole in the subsurface formation, the cable having at least one optical fiber associated therewith, and deploying a seismic sensing tool along the cable. The method may also include causing descent of a remote end of the cable to be arrested, and feeding a further length of the cable into the borehole such that the cable is slack and in contact with at least part of a wall of the borehole. The method may continue with detecting seismic waves traveling through the subsurface formation and into the seismic sensing tool, and using an interrogator coupled to the at least one optical fiber to detect seismic waves traveling through the subsurface formation and into the cable. The method may further continue with determining at least one formation property from the detected seismic waves, using a computer coupled to the seismic sensing tool and to the interrogator.

DETAILED DESCRIPTION

The present description is made with reference to the accompanying drawings, in which example embodiments are shown. However, many different embodiments may be used, and thus the description should not be construed as limited to the embodiments set forth herein. Rather, these embodiments are provided so that this disclosure will be thorough and complete. Like numbers afterceded by different letters refer to like elements throughout.

Figure 1:
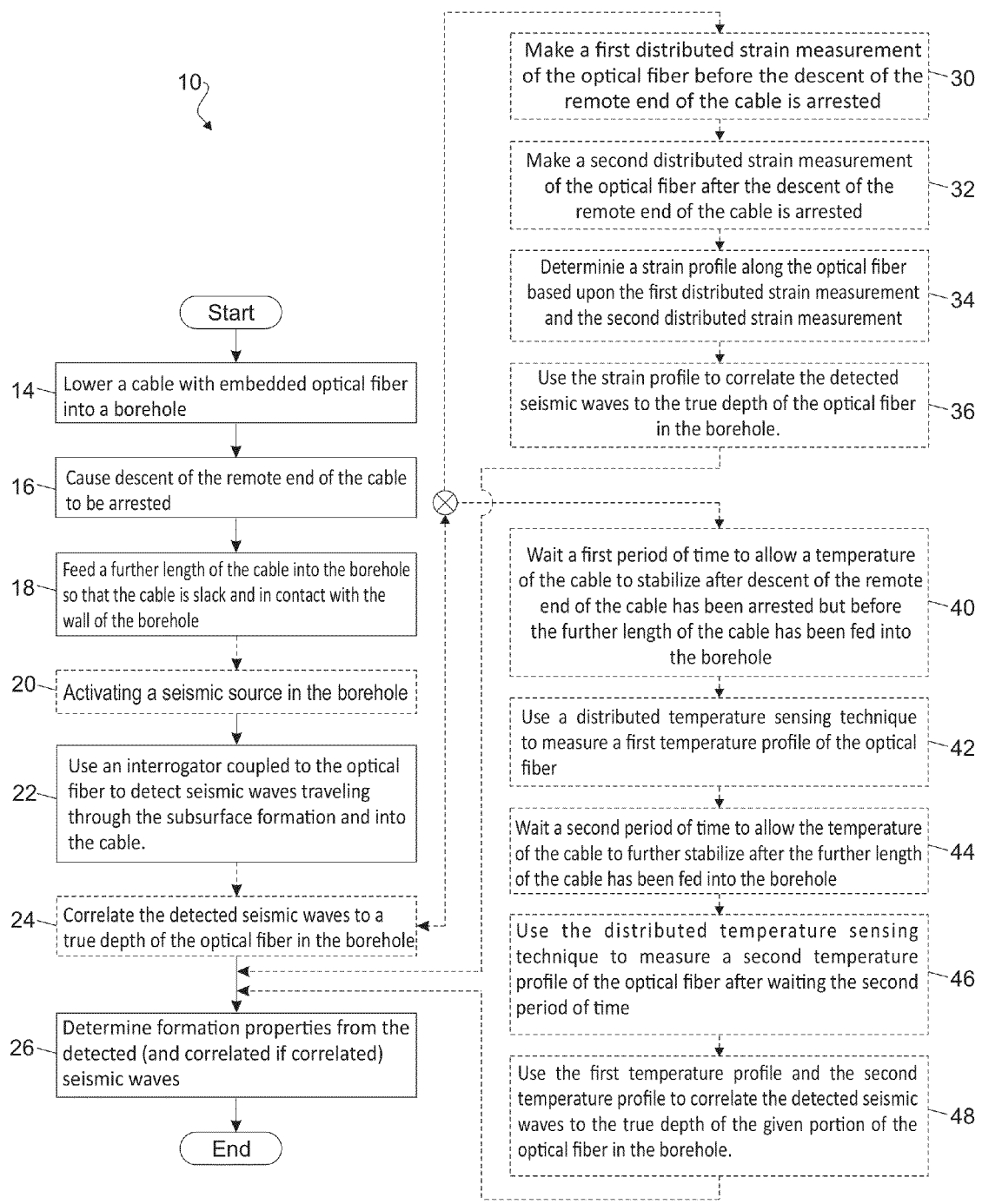
FIG. 1 is a flowchart of a method in accordance with the present disclosure.
Figure 2:
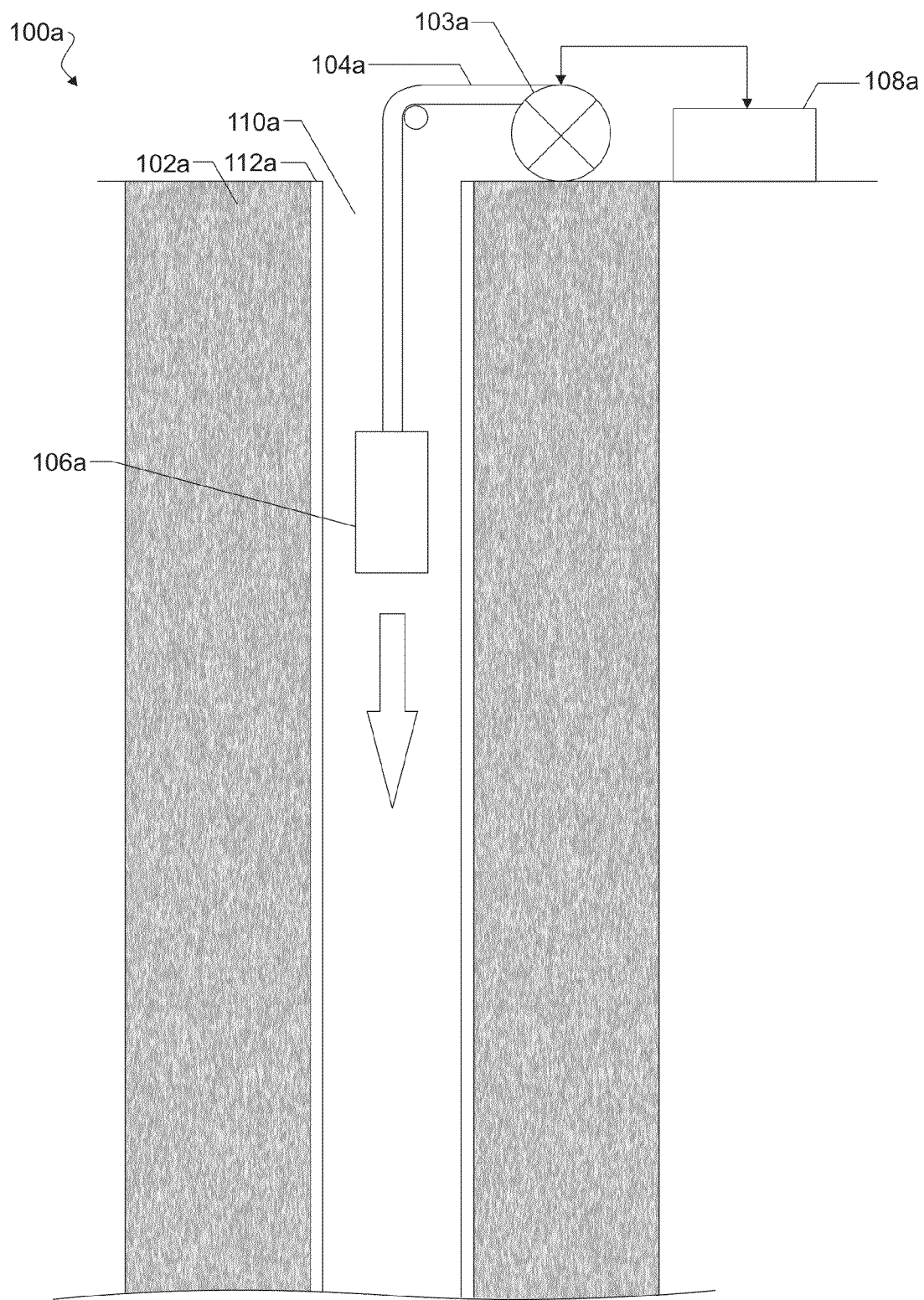
FIG. 2 is a schematic diagram of a step of the method of the present disclosure being performed at a well site.

Referring initially to flowchart 10 of FIG. 1 and well site 100a of FIG. 2, a method for taking borehole seismic measurements is now described. The well site 100a includes a subsurface formation 102a into which a borehole 110a has been drilled. The borehole 110a is illustratively lined with casing 112a, although it should be understood that the methods described herein are equally applicable to uncased boreholes or boreholes fitted in addition with production tubing. A cable spool 103a is disposed proximate to the borehole 110a, and carries cable 104a spooled thereabout. A computer system 108a is coupled to the cable 104a, and optionally to the cable spool 103a. The cable 104a has at least one optical fiber associated therewith, the use for which will be described below in detail. It should be understood that by coupled, it means that the computer system 108a can acquire data from the optical fiber in the cable at the time the seismic measurements are made, or that the data could be acquired from the optical fiber by another source and then fed to the computer system 108a via any suitable data transmission method.

The cable 104a itself may be a "wireline" cable and thus capable of powering tools coupled to it, or may instead be a "slickline" cable. The cable 104a may have the optical fiber or fibers embedded therein, or instead may have the optical fiber or fibers affixed thereto. The optical fiber or fibers may take a helical path in or on the cable 104a. In some applications, the cable 104a may include a plurality of strands, that may or may not be conductive, with the optical fiber or fibers helically wound therethrough, or may instead comprise a plurality of strands helically wound around the optical fiber or fibers.

An exterior surface of the cable 104a can be textured so as to increase friction between the cable and the wall of the borehole 110a. This can help to increase the length of cable 104a in contact with the wall of the borehole 110a. The texturing may be etching or embossing on the surface of the cable 104a. If the cable 104a includes armoring wires, those wires could be partially cut to provide rough edges. If the surface of the cable 104a is extruded, the extrusion process could be modified to provide the texture, such as a series of bumps. As another approach, particles (e.g. glass beads or sand) can be embedded in the cable 104a to provide the texturing. Yet another approach would be to select the hardness of an exterior surface of the cable 104a so that friction between the cable and the wall of the borehole 110a is increased. One way to of doing this could be by the cable 104a having a soft coating around at least portions of it that conforms to asperities in the wall of the borehole 110a.

Figure 3:
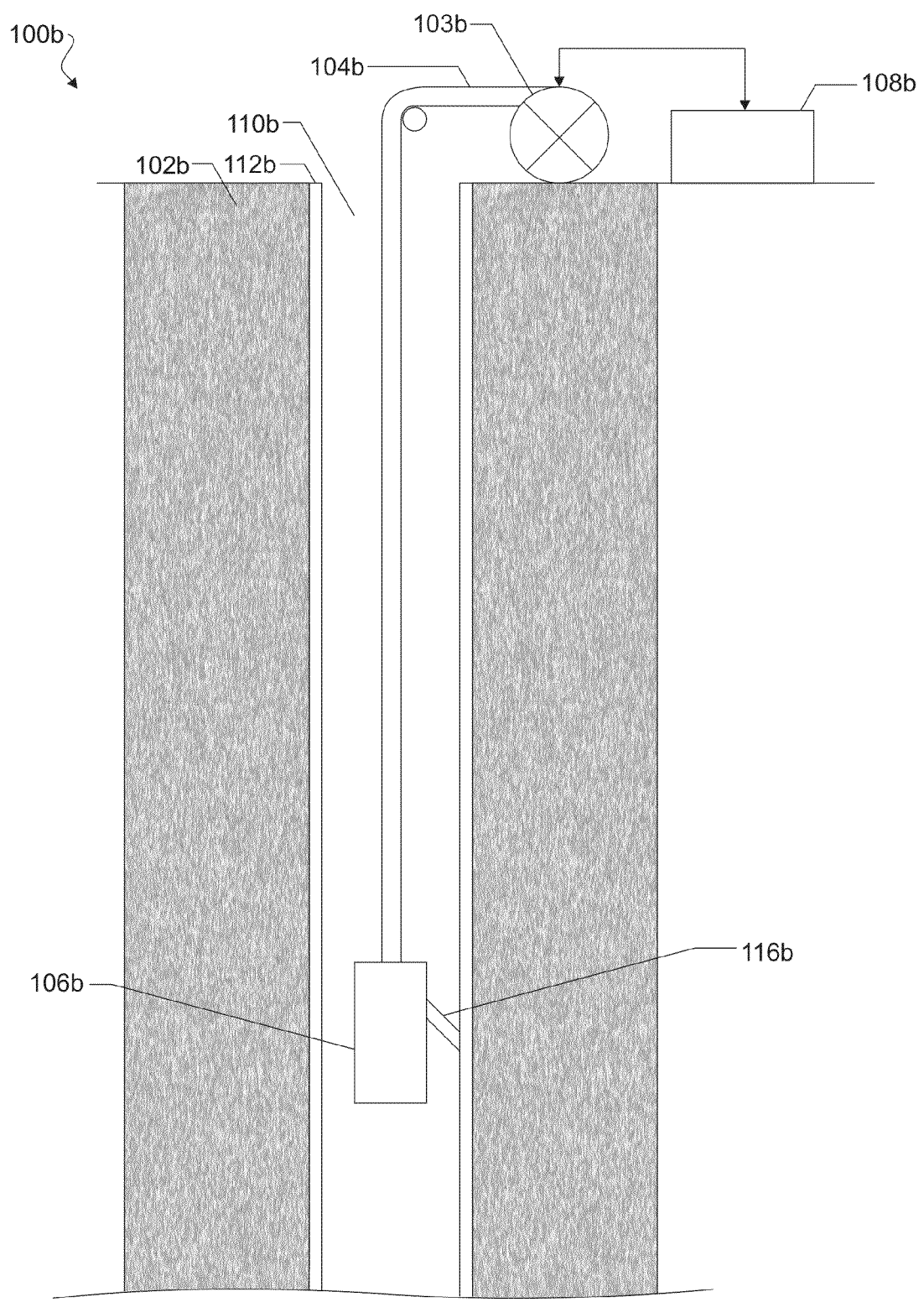
FIG. 3 is a schematic diagram of another step of the method of the present disclosure being performed at a well site.

The cable 104a is illustratively in the borehole 110a, and a tool 106a is carried at the end of the cable. The tool 106a need not be carried at the end of the cable 104a, however, and thus a portion of the cable may extend below the tool. The method begins by lowering the cable 104a into the borehole 110a (Block 14), as shown in FIG. 2. The descent of the cable 104b is then arrested (Block 116), as shown in FIG. 3. Here, the descent is arrested by an anchoring system 116b associated with the tool 106b, although it should be understood that the tool itself may be the anchoring system.

The anchoring system 116b may be electrically operated and function in a variety of ways as will be appreciated by those of skill in the art. For example, the anchoring system 116b may include an electromagnet or permanent magnet where the wellbore is one lined with casing, or may include any number of arms, levers, pistons, or other mechanical devices to anchor the cable 104b to the wall of the borehole. The anchoring system 116b may in some applications instead be fully mechanically operated, for example by clockwork, and thus not rely upon electronic control. The anchoring system 116b may in other applications be operated or triggered via pressure, such that an arm, force operated anchoring arm, lever, piston, or other anchoring device deploys when the fluid in the borehole 110b reaches a certain pressure (and the pressure of the fluid in the borehole may be artificially manipulated by means known to those of skill in the art).

Figure 5:
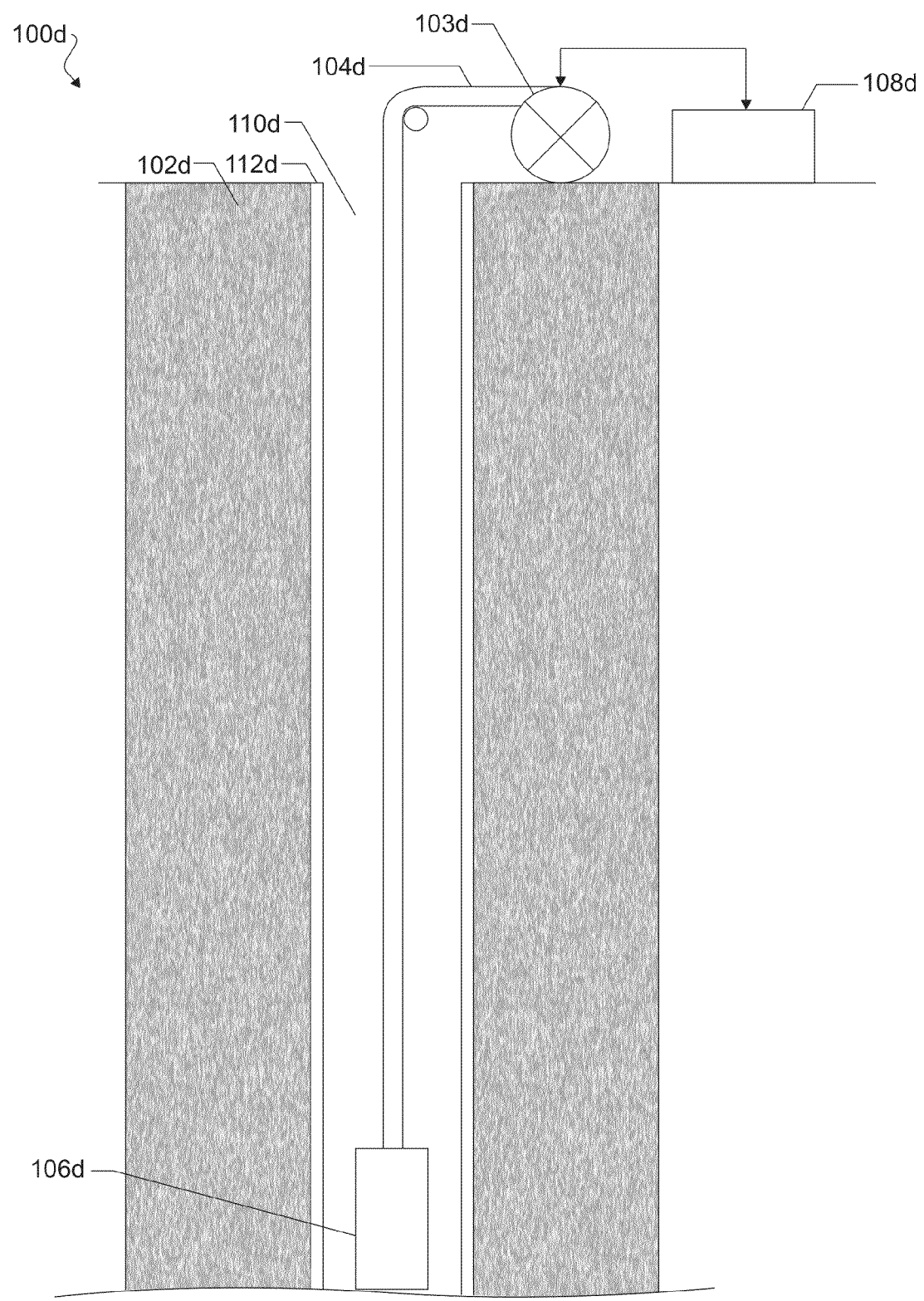
FIG. 5 is a schematic diagram of an alternative step of the method of the present disclosure being performed at a well site.

It should also be appreciated that rather than using an anchoring system, the cable 104d may be simply lowered until it contacts a restriction in the borehole, for example the bottom of the borehole 110d, as shown in FIG. 5. Other restrictions, such as a smaller diameter portion of casing, a turn in the borehole 110d, or an anchor (such as a retrievable packer) left behind by another tool, are also possible.

Figure 4:
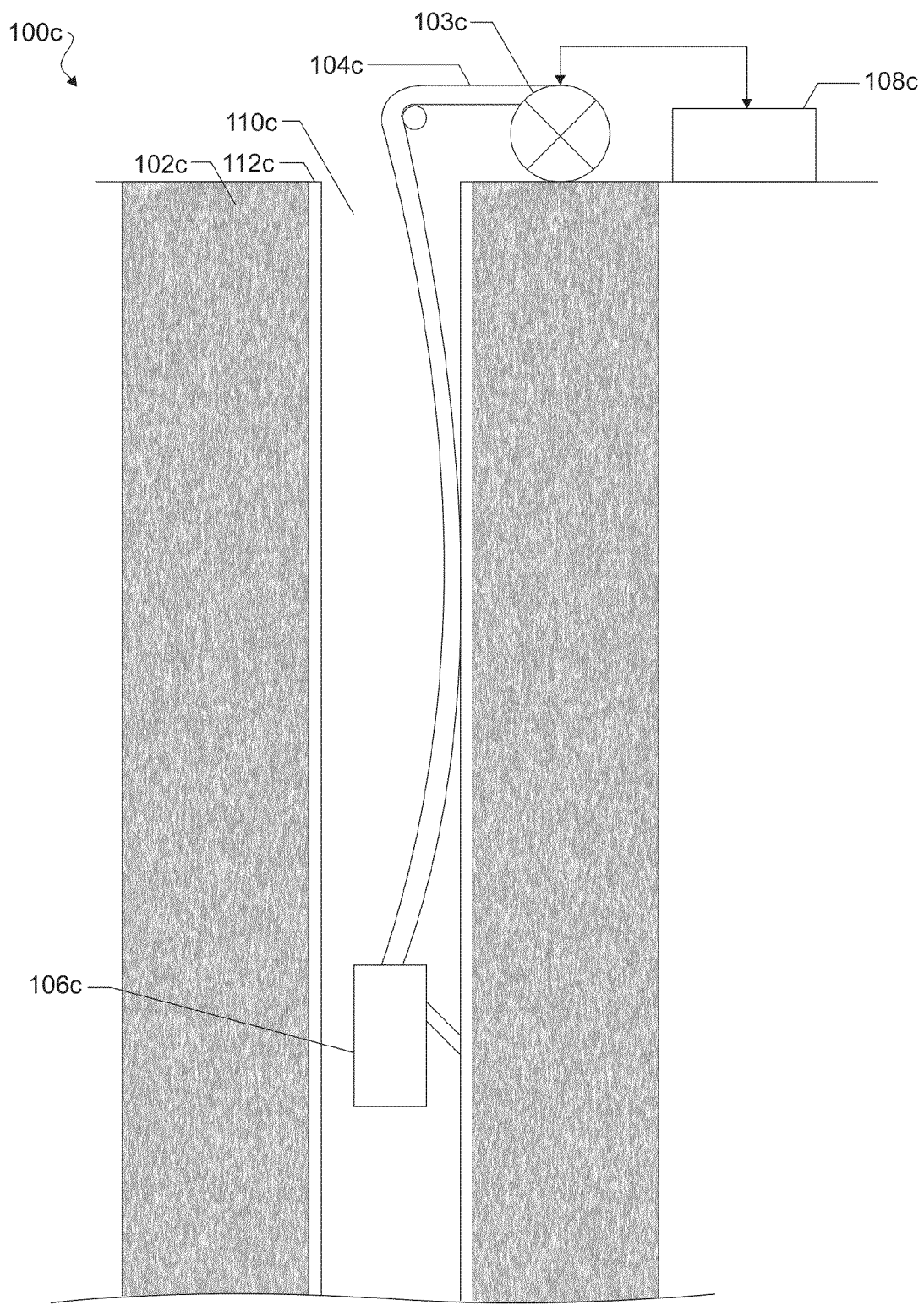
FIG. 4 is a schematic diagram of a further step of the method of the present disclosure being performed at a well site.
Figure 6:
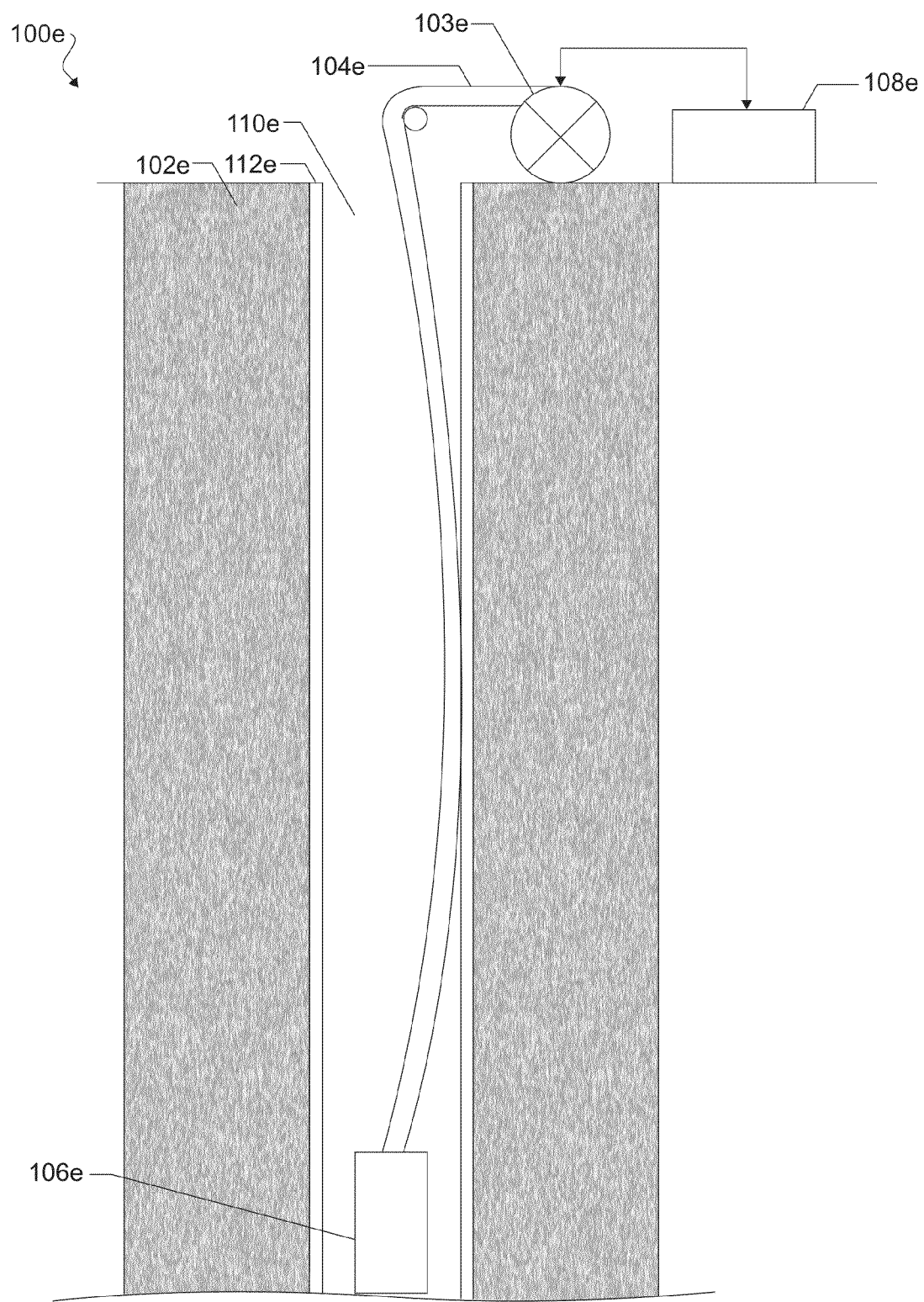
FIG. 6 is schematic diagram of a further alternative step of the method of the present disclosure being performed at a well site.

As shown in FIG. 4 after the descent of the remote end of the cable 104c has been arrested, a further length of the cable is fed into the borehole so that the cable is slack and in contact with the wall of the borehole (Block 18). (This is the same in the case where the remote end of the cable 104e, or the tool 106c at the remote end of the cable, is sitting at the bottom of the borehole 110e, as shown in FIG. 6.)

The inventors have found a range of between 20 ft-80 ft of additional cable feed in to be useful, although different amounts may be desirable in different situations. For example, the lower the remote end of the cable 104c is in the borehole 110c, the longer the amount of excess cable fed that may be desirable. In addition, the amount of slack used may depend on the diameter of the borehole and its inclination from a perfectly vertical direction.

Next, an active seismic source may optionally be used to induce seismic waves in the formation 102c (Block 20). The active seismic source may be located in the borehole 110c, for example as part of the tool 106c. The active seismic source may in some applications instead be located on the surface, or in another borehole. The active seismic source may be any suitable active seismic source, and the details of such are known to those of skill in the art and thus need no further discussion herein.

Since the active seismic source is optional, the optical fiber may instead be used to detect naturally occurring seismic waves. Also, the optical fiber may be used to detect seismic waves generated by a microseismic event (i.e. resulting from natural movements in the formation 102c, or caused by changes in the pore pressure of the formation resulting from fluid extraction or injection). It may also detect signals caused by earthquakes or caused by man-made noise (such as traffic, or drilling activity in nearby boreholes).

An interrogator (here, part of the computer system 108c) coupled to the optical fiber is then used to detect seismic waves traveling through the formation 102c and into the cable 104c (Block 22). The interrogator converts the optical signals returning from the optical fiber into electrical signals which can then be used to create a log, from which a variety of information about formation properties can be extracted and inferred. Since the cable drum is being rotated in order to lower and retrieve the cable and tool, the optical fiber in the cable may be connected to the interrogator through a slip-ring (a device also known as a collector—which similarly to electrical devices of the same name allows a connection to be maintained while the drum is rotated); in a different configuration, the connection may be made via a demountable connector when the drum is stationary and disconnected prior to rotating the drum (in which case an interlock system may be included in the control system to prevent an inadvertent rotation of the drum while the fiber lead to the interrogator is connected).

Since the cable 104c is purposely slack in this method, it may be helpful to correlate a measured position along the cable to a corresponding true position in the borehole 110c. This correlation is particularly useful if the optical fiber takes a helical path in or on the cable 104c, and thus the length of the optical fiber and the length of the cable are not equal (and the length of optical fiber portions corresponding to different equal length portions of the cable may not be equal). This correlation can be made at the time of manufacture of the cable 104c. However, further uncertainties may be introduced due to a change in the strain of the cable as it is slackened. Therefore, the detected seismic waves may optionally be correlated to a true depth of the portion of the optical fiber at which they were measured (Block 24).

A variety of correlation methods may be used. For example, the strain profile of the optical fiber may be determined, and then used to correlate detected seismic waves to the true depth of the portion of the optical fiber at which they were measured. One way to determine the strain profile will now be described.

Under this method of determining the strain profile of the optical fiber, a first distributed strain measurement of the optical fiber is made before the descent of the remote end of the cable 104c is arrested (Block 30). A second distributed strain measurement of the optical fiber is then made after the descent of the remote end of the cable 104c is arrested (Block 32). The strain profile of the optical fiber may then be determined based upon the first and second distributed strain measurements (Block 34). As mentioned above, this strain profile may then be used to correlate the detected seismic waves to the true depth of the portion of the optical fiber at which they were measured (Block 36).

Different techniques may be used to make the distributed strain measurements. For example, Brillouin and/or Rayleigh backscatter may be measured and used to make the distributed strain measurements. These distributed measurement techniques are well known to those familiar to fiber-optic sensing but, to provide context, they will be summarized here. Although frequency-domain equivalents are possible, the description will be based on the more common optical time-domain reflectometry (OTDR) methods, in which one or more optical pulses is (are) launched in an optical and the backscattered radiation is acquired as a function of time from the launching of the pulse. The time determines the location in the fiber at which the scattering occurred, similarly to time-domain reflectometry in electrical cables or, in free-space, to the concept of radar. The signal that returns to the launching end in these techniques results from scattering of a small fraction of the light at every elemental position along the fiber. A small fraction of the scattered light falls within the acceptance solid angle of the fiber in the return direction and is thus guided back towards the launching end. Of course, the outgoing probe pulses suffer losses as they travel down the fiber, as does the backscattered light on its return.

In the case of Brillouin scattering, the signal originates from the interaction between the probe light and acoustic phonons in the glass. In spontaneous Brillouin scattering, the phonons are thermally generated and, where their acoustic wavelength matches the optical wavelength of the probe light, scattering occurs. The relevant frequency where this matching occurs is of course angle dependent but for backscattered light, and at a probe wavelength of 1550 nm, the phonon frequency is approximately 10 GHz; as a result of this scattering process, new frequencies appear in the scattered light spectrum, with typically one down shifted in frequency (Stokes shift) and one up-shifted (anti-Stokes line). Both the frequency shift of these lines and their intensity are functions of strain and temperature and thus by measuring one or both of the frequency shift and intensity of the scattering, the temperature and strain can be determined. In practice, it may be easier and more precise to measure just the frequency and a number of approaches have been used to obtain independent strain and temperature profiles, for example by selecting fiber types where the Brillouin spectra contain multiple lines, with linearly independent responses to these parameters. Alternative techniques, based on stimulated Brillouin scattering, involving the counter propagation of two beams separated by one Brillouin frequency shift are also known in the art.

A multi-frequency Rayleigh measurement, such as that described in U.S. Pat. No. 7,859,654 may also be used. Rayleigh backscatter originates in the interactions of incident photons with small-scale (sub-wavelength) fluctuations in the refractive index of the fiber; these are almost invariably frozen-in to the glass when it is drawn into a fiber. Whereas the Rayleigh backscatter generated by a probe having a broad spectrum has little sensitivity to strain or temperature, using a narrowband source for a Rayleigh OTDR has profound implications. In this context "narrowband" means a spectral width of the source prior to modulation into pulses similar or much less than the inverse pulse duration. In this case, the scattering returns from each of the elemental locations (scatterers) within the section of fiber occupied at any time by the probe pulse have a random, but fixed phase relationship. The backscatter signal returning from this location is thus the vector sum of the electric fields of the scattered light from each scatterer and the result thus depends on the relative phase of these signal components. If the frequency of the source or the relative positions of the scatters is varied, e.g. through changes in temperature or strain, then the backscatter signal alters. This mechanism is often that used for detecting the seismic signals in another aspect of the present invention; with a single narrowband source, it is difficult to make an absolute measurement. However, if a plurality of probe pulses at different optical frequencies is launched in such a way that their individual backscatter signatures can be distinguished, then, as taught in U.S. Pat. No. 7,859,654, the strain or temperature profile can be inferred.

Depending upon the length of optical fiber in the cable, correlation based upon the strain profile on the optical fiber may not be as accurate as desired. In such instances, distributed temperature sensing may be used instead, or in addition to, strain profile determination. A method of correlation using distributed temperature sensing will now be described.

As per this method, a first period of time is waited to allow a temperature of the cable 104c to stabilize after descent of the remote end of the cable has been arrested but before the further length of the cable has been fed into the borehole 110c (Block 40). This time can vary between 1 and 60 minutes, and may depend upon the temperature of the borehole 110c and fluid within the borehole, as well as the heat capacity per unit length of the cable and the nature of the fluid, in particular its heat capacity and viscosity. A distributed temperature sensing technique is then used to measure a first temperature profile of the optical fiber (Block 42). One distributed temperature sensing technique may include measuring Raman backscatter, instead of or as well as the previously mentioned Brillouin and Rayleigh methods.

Raman backscattering is another OTDR-based distributed sensing method. The temperature information may be gleaned from analyzing the spectrum of the scattered light and in particular by selecting the short-wavelength (so called "anti-Stokes") Raman light. Raman scattering is a process that results from the interaction of incident light with molecular vibrations and results in a small fraction of the incident light being scattered at a frequency shifted relative to the incident light. The intensity of the anti-Stokes (AS) Raman signal is dependent on temperature and can thus be used to determine the temperature profile all along the fiber. The Raman frequency shift is much larger than that of the Brillouin process (c. 13 THz, vs. c. 10 GHz) and its spectral width is also broader (a few THz, vs. a few tens of MHz).

In general, a number of other effects influence the intensity of the AS Raman signal profile and therefore it is common to normalize this profile to the Stokes (long-wavelength shifted) signal which is less temperature sensitive, but is influenced by many of the same effects (such as largely common losses, effects of fiber properties, such as diameter and composition changes and so on). Further corrections are commonly made by referencing each signal to a section of fiber, typically within the instrument, that is at a known temperature. Finally, the measurement is commonly made with many pulses (several thousand or tens to hundreds of thousand) pulses with the results being averaged to improve the signal to noise ratio. It should be added that this technique is well known in the field of fiber-optic sensors (see GB2140554). Other techniques for distributed temperature measurement have been mentioned above and could be used for the purpose of measuring the temperature profile of the fiber in the cable. In addition quasi-distributed (i.e. multi-point) techniques are also known and would allow temperature and strain profiles to be measured at a number of locations along the cable, for example by inscribing fiber Bragg gratings in one or more of the fibers in the cable, according to methods very well known in the literature.

A second period of time is then waited to allow the temperature of the cable 104c to further stabilize after the further length of the cable has been fed into the borehole (Block 44). This time can vary between 1 and 60 minutes, for example, and may depend upon the temperature of the borehole 110c and fluid within the borehole, as well as the heat capacity per unit length of the cable 104c and the nature of the fluid, in particular its heat capacity and viscosity. A distributed temperature sensing technique is then used to measure a second temperature profile of the optical fiber (Block 46). The first and second temperature profiles are then used to correlate the detected seismic waves to the true depth of the portion of the optical fiber in the borehole 110c (Block 48).

In some applications (particularly where Raman is used for the temperature measurement), the distributed temperature measurements are made using an additional multimode optical fiber that is embedded in, or carried on, the cable 104c. Such a multimode optical fiber may provide a better resolution for temperature and distance for a given measurement time than making the same measurement using the same optical fiber as is preferably used for vibration. In addition, using the additional fiber for the distributed temperature measurements allows the temperature profiles to be determined simultaneously with the seismic waves being detected. However, it should be noted that the same optical fiber can be used for temperature, strain and vibration measurement either sequentially, or simultaneously, using wavelength-division multiplexing techniques.

Another correlation method may include using an already determined geothermal gradient. This geothermal gradient may have been determined by another tool coupled to the cable 104c (for example within tool 106c), or may have been determined at a previous time during a previous run.

After the optional correlation is performed formation properties can then be determined from the detected and correlated data about the seismic waves (Block 26).

Figure 7:
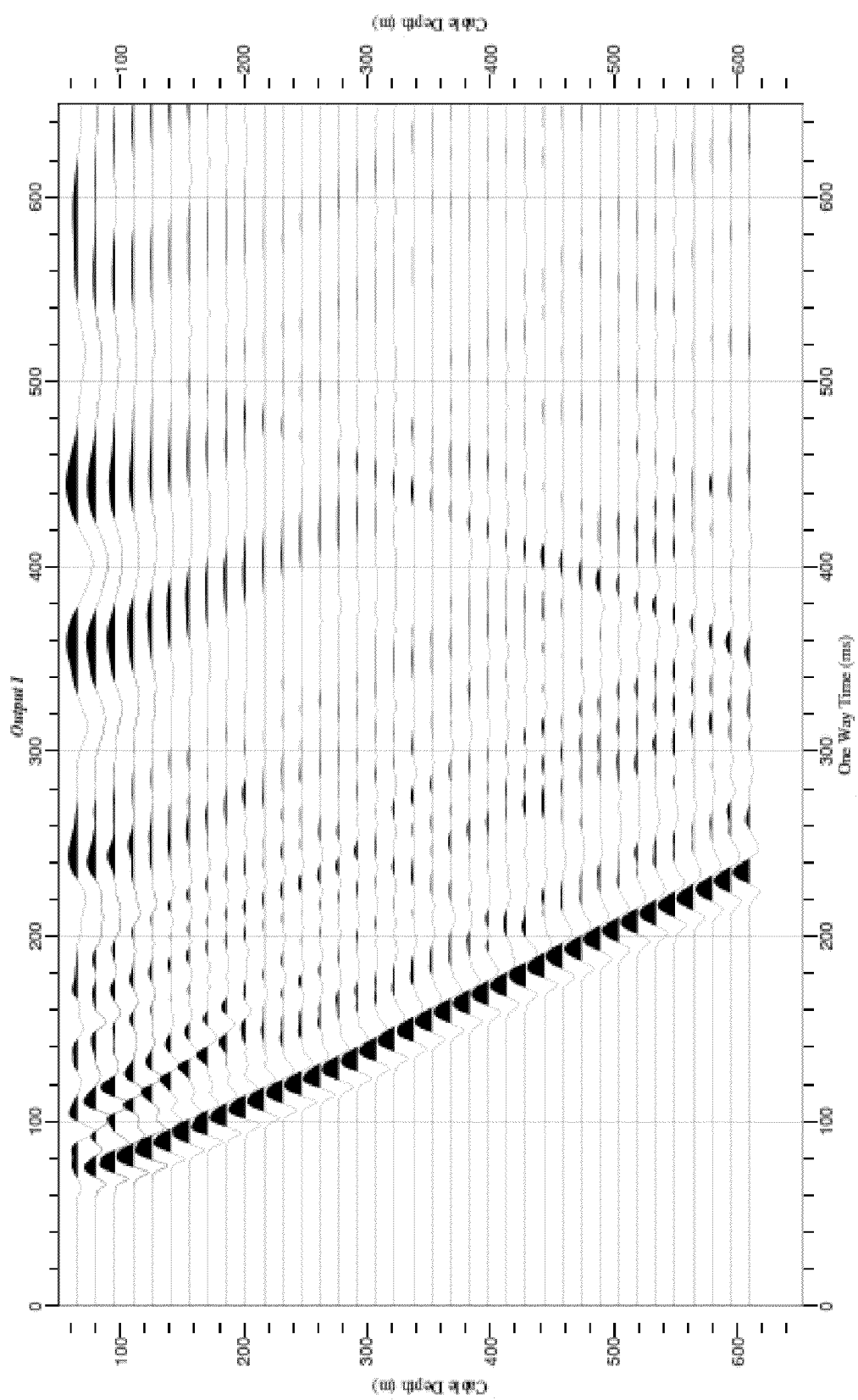
FIG. 7 is a plot of borehole seismic readings from a traditional borehole seismic tool showing depth vs. time.
Figure 8:
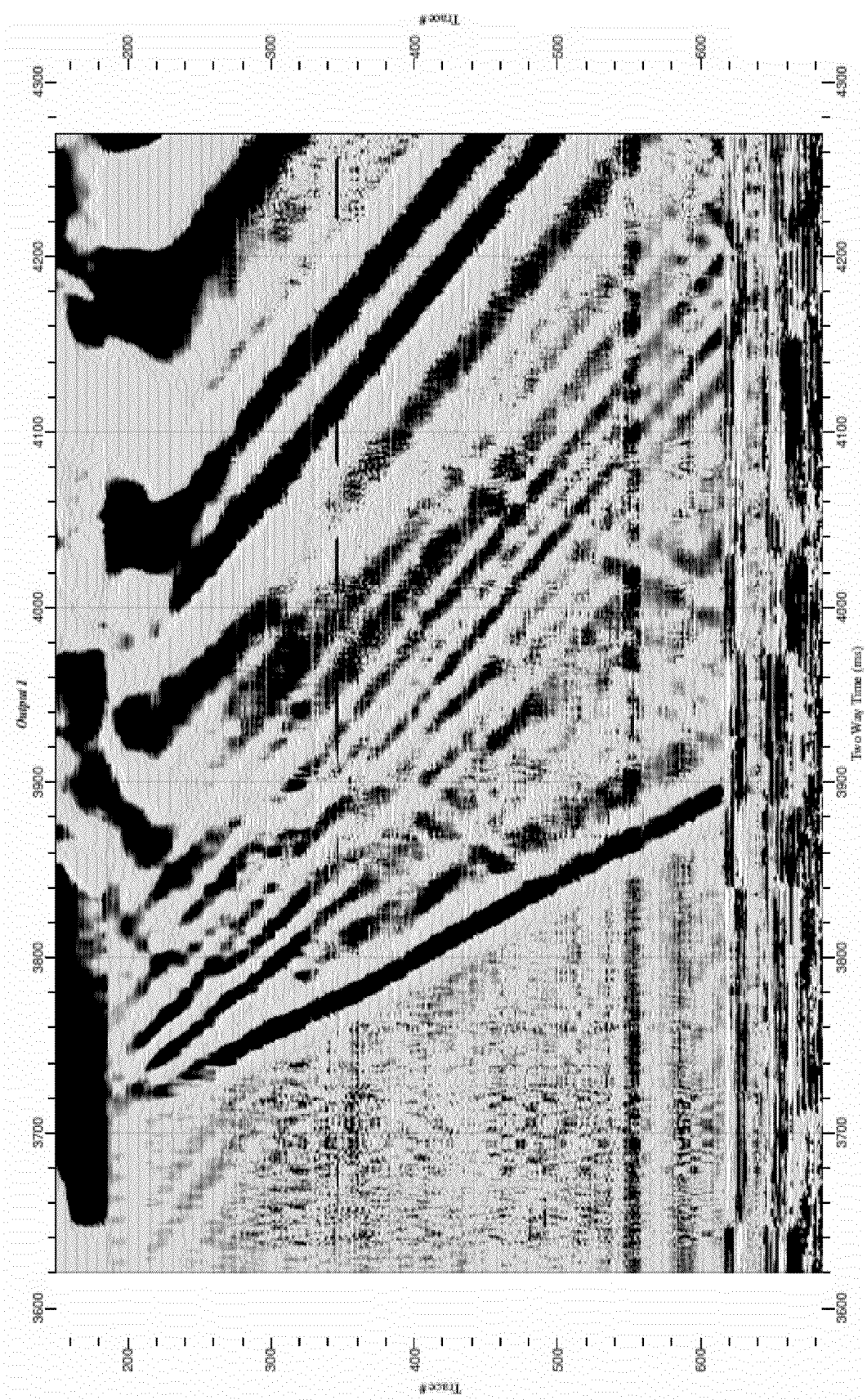
FIG. 8 is a plot of borehole seismic readings taken according to the method of the present disclosure showing depth vs. time.

Depth vs. Time plots for seismic measurements taken with a borehole seismic tool that uses traditional sensors distributed at different points in the well, as well as for seismic measurements taken using the method involving the optical fiber disclosed herein, are shown in FIGS. 7 and 8, respectively, for comparison. As can be seen, although the plot taken with traditional sensors (FIG. 7) has less distortion, the plot taken with the optical fiber (FIG. 8) has a much greater resolution given that it is able to take continual data along an entire section of borehole 110c as opposed taking data from discrete points in the borehole. The plot taken with traditional sensors (FIG. 7) includes P-waves and S-waves, together with their reflections; the plot taken with the optical fiber (FIG. 8) also includes tube waves. While some traditional tools seek to eliminate the detection of tube waves, tube waves can be useful in determining properties of fluid in the borehole (e.g., U.S. Pat. No. 8,408,064) and certain properties of the borehole.

Many modifications and other embodiments will come to the mind of one skilled in the art having the benefit of the teachings presented in the foregoing descriptions and the associated drawings. Therefore, it is understood that various modifications and embodiments are intended to be included within the scope of the appended claims.

The invention claimed is:

1. A method of detecting seismic waves traveling through a subsurface formation comprising:
lowering a cable into a borehole in the subsurface formation, the cable having at least one optical fiber associated therewith;
causing descent of a remote end of the cable to be arrested;
feeding a further length of the cable into the borehole such that the cable is slack and in contact with at least part of a wall of the borehole; and
detecting seismic waves traveling through the subsurface formation and into the cable based at least in part on a response of the optic fiber to the seismic waves.

2. The method of claim 1, wherein the seismic waves are generated by activating a seismic source at the surface.

3. The method of claim 1, wherein the seismic waves are generated by activating a seismic source in the borehole.

4. The method of claim 1, wherein the seismic waves are generated by activating a seismic source in another borehole.

5. The method of claim 1, wherein the seismic waves are generated by a microseismic event.

6. The method of claim 1, wherein the descent of the remote end of the cable is arrested by a bottom of the borehole.

7. The method of claim 1, wherein the descent of the remote end of the cable is arrested by a restriction in the borehole.

8. The method of claim 1, wherein the descent of the remote end of the cable is arrested by an anchoring system.

9. The method of claim 1, wherein an exterior surface of the cable is textured so as to increase friction between the cable and the wall of the borehole.

10. The method of claim 1, wherein a hardness of an exterior surface of the cable is selected so as to increase friction between the cable and the wall of the borehole.

11. The method of claim 1, wherein the cable has the at least one optical cable embedded therein.

12. The method of claim 1, wherein the cable has the at least one optical cable affixed thereto.

13. The method of claim 1, wherein the cable comprises a plurality of strands with the at least one optical cable helically wound therethrough.

14. The method of claim 1, wherein the cable comprises a plurality of strands wound helically around the at least one optical fiber.

15. The method of claim 1, further comprising determining at least one formation property from the detected seismic waves, using a computer coupled to an interrogator that is coupled to the optic fiber.

16. The method of claim 15, wherein determining the at least one formation property includes correlating the detected seismic waves to a true depth of a given portion of the at least one optical fiber in the borehole.

17. The method of claim 16, wherein correlating the detected seismic waves to the true depth of the given portion of the at least one optical fiber in the borehole comprises:
making a first distributed strain measurement of the at least one optical fiber before the descent of the remote end of the cable is arrested;
making a second distributed strain measurement of the at least one optical fiber after the descent of the remote end of the cable is arrested;
determining a strain profile along the at least one optical fiber based upon the first distributed strain measurement and the second distributed strain measurement;
using the strain profile to correlate the detected seismic waves to the true depth of the given portion of the at least one optical fiber in the borehole.

18. The method of claim 17, wherein the first distributed strain measurement is a first Brillouin backscatter measurement; and wherein the second distributed strain measurement is a second Brillouin backscatter measurement.

19. The method of claim 17, wherein the first distributed strain measurement is a first Rayleigh backscatter measurement; and wherein the second distributed strain measurement is a second Rayleigh backscatter measurement.

20. The method of claim 16, wherein correlating the detected seismic waves to the true depth of the given portion of the at least one optical fiber in the borehole comprises:
   waiting a first period of time to allow a temperature of the cable to stabilize after descent of the remote end of the cable has been arrested but before the further length of the cable has been fed into the borehole;
   using a distributed temperature sensing technique to measure a first temperature profile of the at least one optical fiber;
   waiting a second period of time to allow the temperature of the cable to further stabilize after the further length of the cable has been fed into the borehole;
   using the distributed temperature sensing technique to measure a second temperature profile of the at least one optical fiber after waiting the second period of time;
   using the first temperature profile and the second temperature profile to correlate the detected seismic waves to the true depth of the given portion of the at least one optical fiber in the borehole.

21. The method of claim 16, wherein the at least one optical fiber comprises a vibration sensing optical fiber and a temperature sensing optical fiber; and wherein correlating the detected seismic waves to the true depth of the given portion of the at least one optical fiber in the borehole comprises:
   waiting a first period of time to allow a temperature of the cable to stabilize after descent of the remote end of the cable has been arrested but before the further length of the cable has been fed into the borehole;
   using a distributed temperature sensing technique to measure a first temperature profile of the temperature sensing optical fiber;
   waiting a second period of time to allow the temperature of the cable to further stabilize after the further length of the cable has been fed into the borehole;
   using the distributed temperature sensing technique to measure a second temperature profile of the temperature sensing after waiting the second period of time;
   using the first temperature profile and the second temperature profile to correlate the detected seismic waves to the true depth of the given portion of the vibration sensing optical fiber in the borehole.

22. A method of detecting seismic waves traveling through a subsurface formation comprising:
   lowering a cable into a borehole in the subsurface formation, the cable having at least one optical fiber associated therewith;
   deploying a seismic sensing tool associated with the cable;
   causing descent of a remote end of the cable to be arrested;
   feeding a further length of the cable into the borehole such that the cable is slack and in contact with at least part of a wall of the borehole;
   detecting, at least partially by the optical fiber, seismic waves traveling through the subsurface formation and into the seismic sensing tool;
   using an interrogator coupled to the at least one optical fiber to detect seismic waves traveling through the subsurface formation and into the cable; and
   determining at least one formation property from the detected seismic waves, using a computer coupled to the seismic sensing tool and to the interrogator.

23. The method of claim 22, wherein the descent of the remote end of the cable is arrested by an anchoring mechanism of the seismic sensing tool.

24. The method of claim 22, wherein the seismic waves are generated by activating a seismic source at the surface.

25. The method of claim 22, wherein the seismic waves are generated by activating a seismic source in the borehole.

26. The method of claim 22, wherein the seismic waves are generated by a microseismic event.

27. The method of claim 22, wherein the cable comprises a plurality of strands with the at least one optical cable helically wound therethrough.

28. The method of claim 21, wherein the cable comprises a plurality of strands wound helically around the at least one optical fiber.

29. The method of claim 21, wherein determining the at least one formation property includes correlating the detected seismic waves to a true depth of a given portion of the at least one optical fiber in the borehole.

* * * * *